June 18, 1935.  A. S. MACDONALD  2,005,434
CONVERTIBLE BOOKSTACK
Filed Jan. 6, 1932  8 Sheets-Sheet 1

INVENTOR
Angus S. Macdonald
BY
ATTORNEYS

June 18, 1935. A. S. MACDONALD 2,005,434
CONVERTIBLE BOOKSTACK
Filed Jan. 6, 1932 8 Sheets-Sheet 2
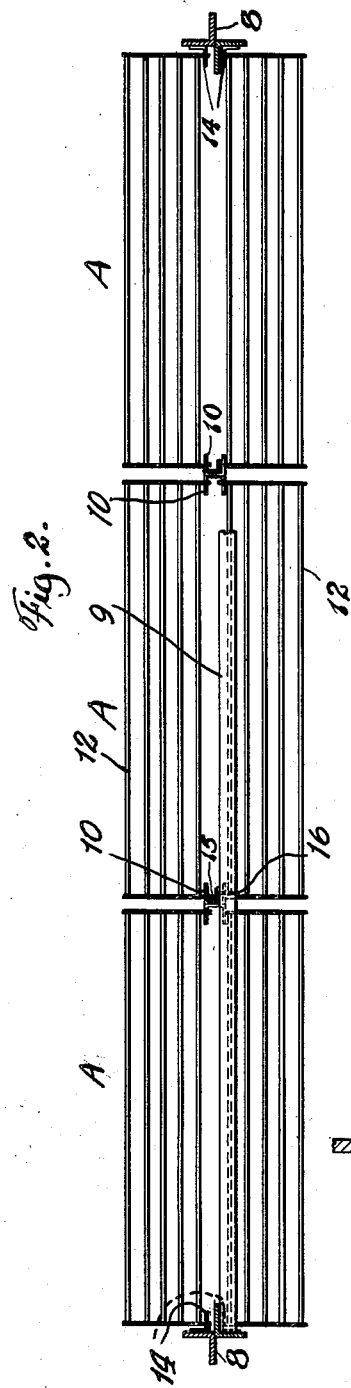
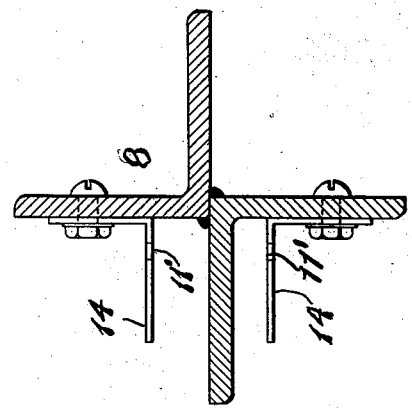
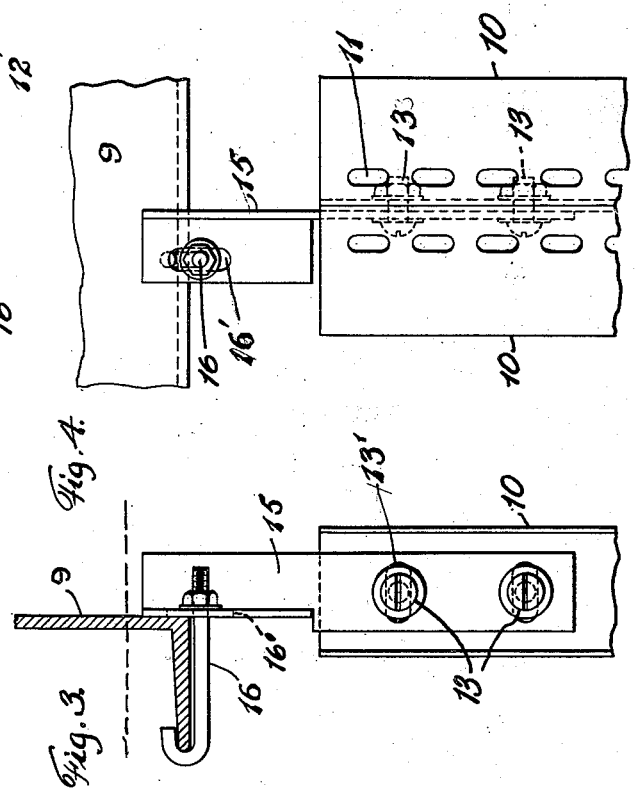
INVENTOR
Angus S Macdonald
BY
ATTORNEYS

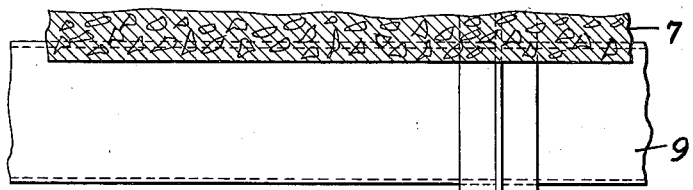
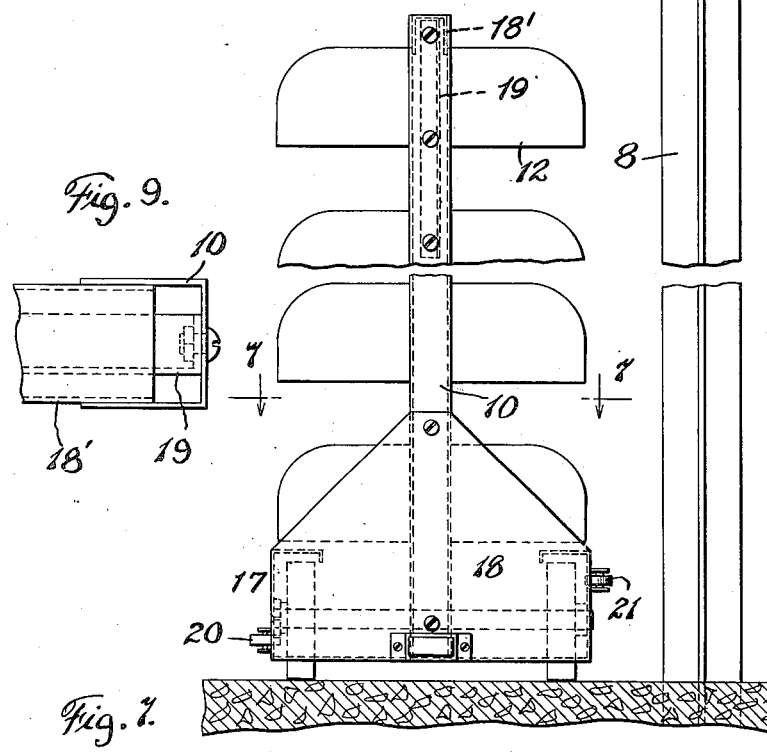
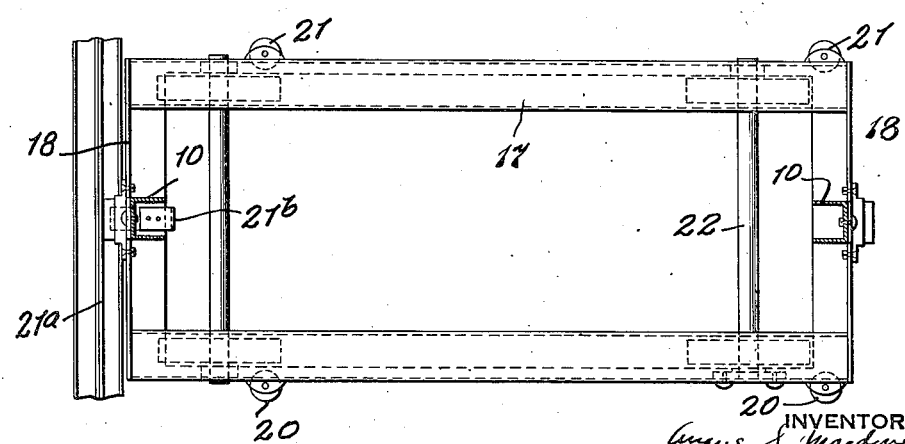

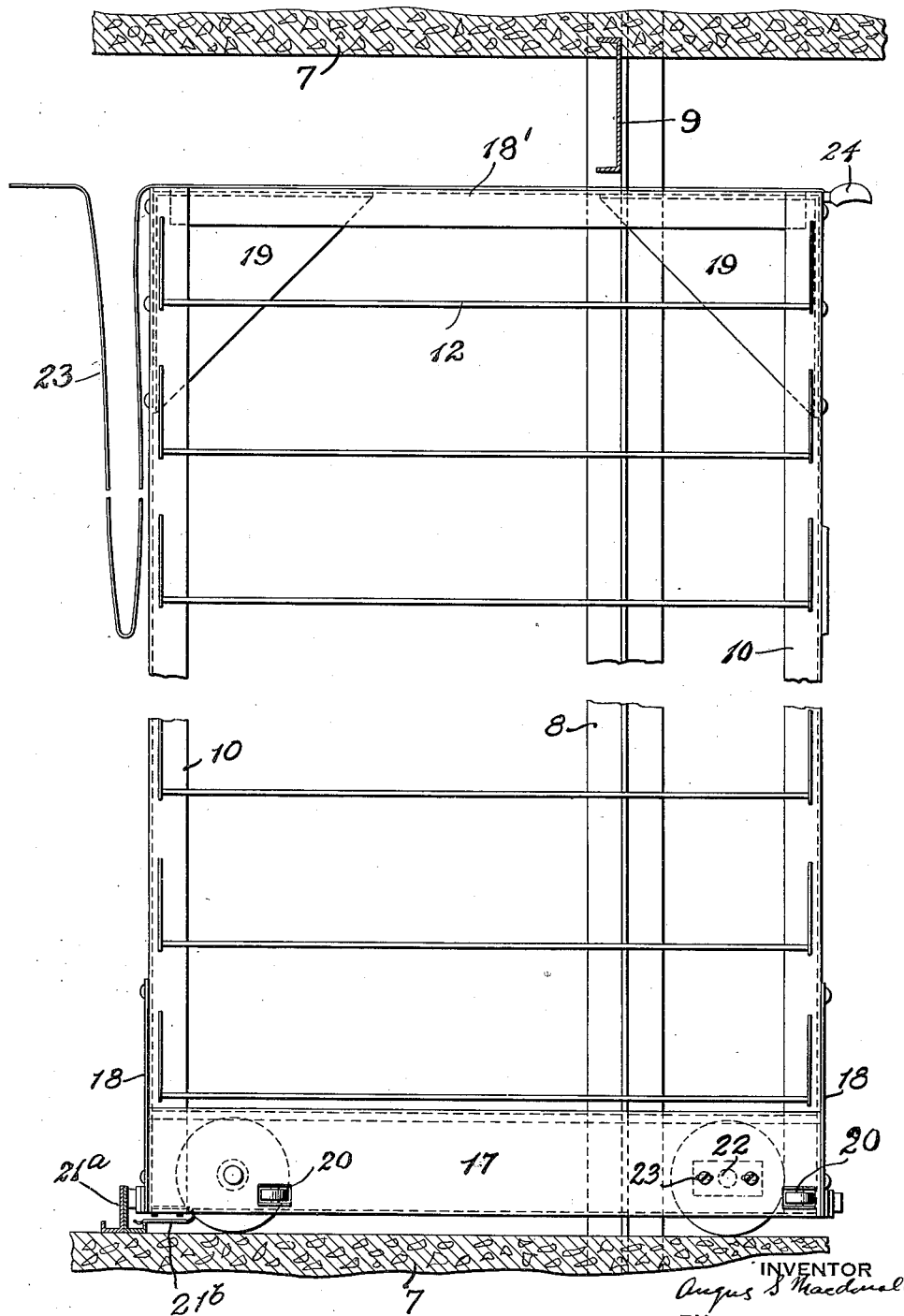

June 18, 1935. A. S. MACDONALD 2,005,434
CONVERTIBLE BOOKSTACK
Filed Jan. 6, 1932 8 Sheets-Sheet 5
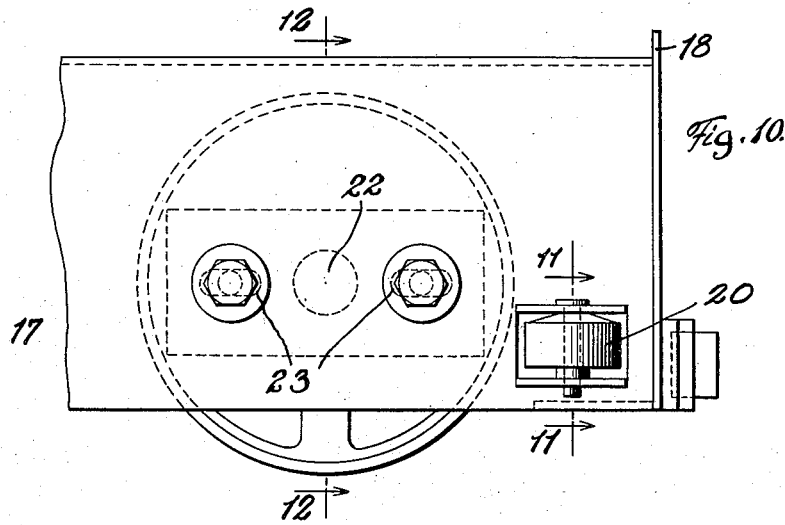
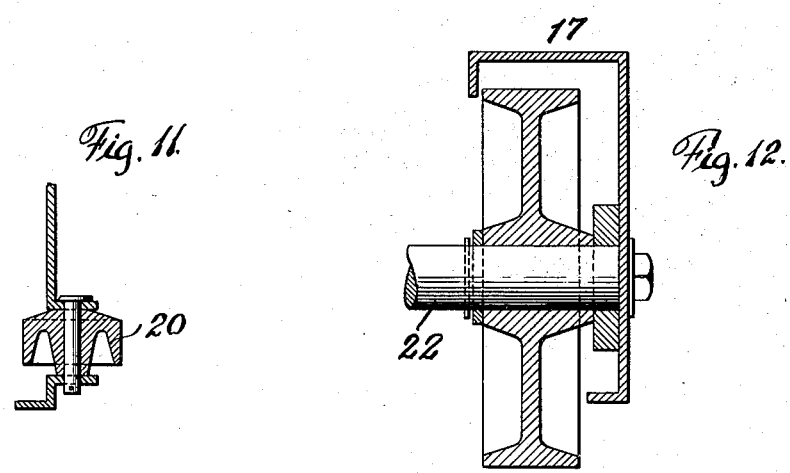
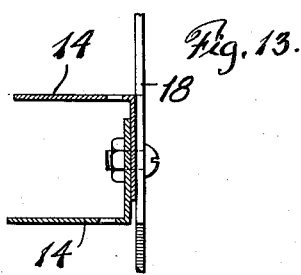
INVENTOR
Angus S Macdonald
BY
ATTORNEYS

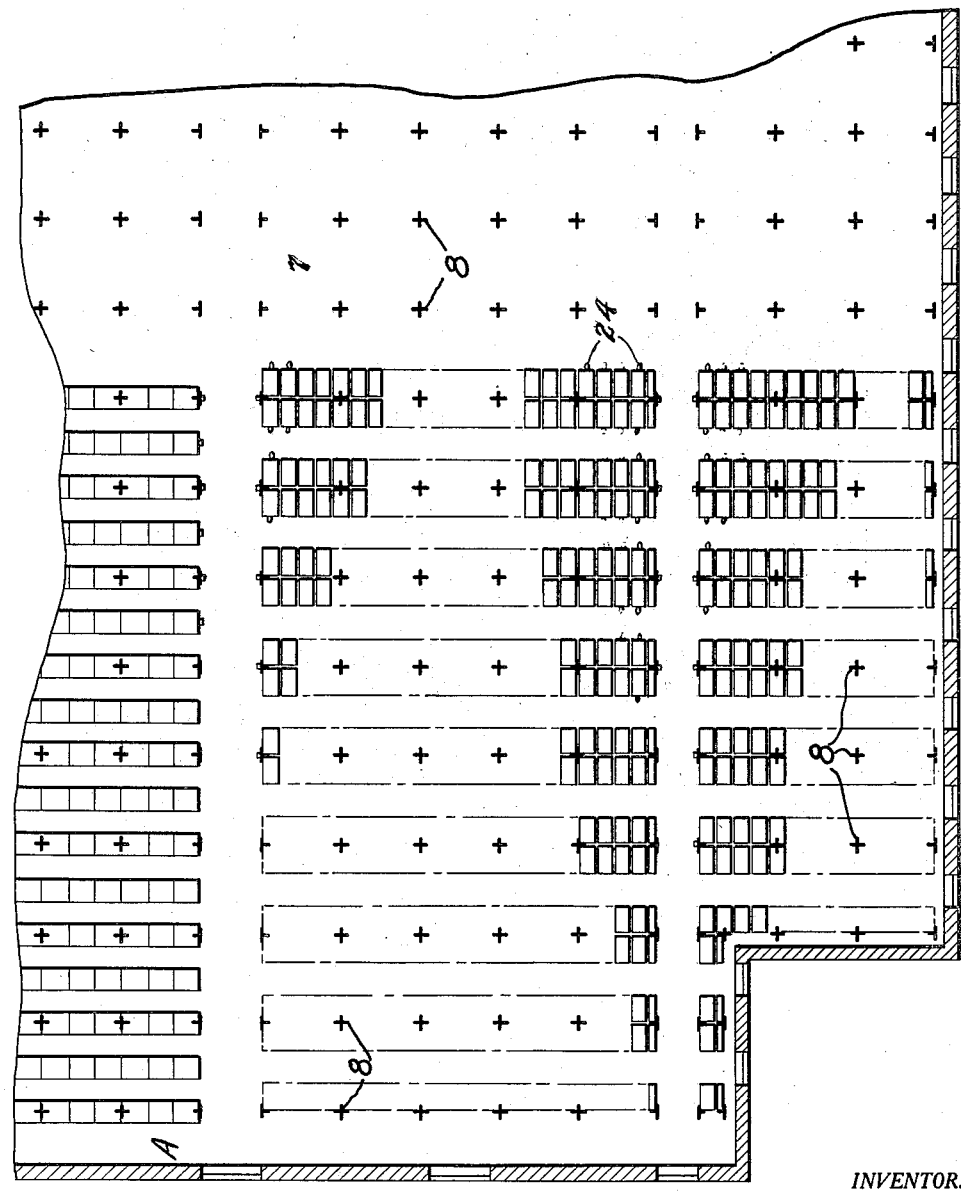

June 18, 1935.  A. S. MACDONALD  2,005,434
CONVERTIBLE BOOKSTACK
Filed Jan. 6, 1932   8 Sheets-Sheet 7

INVENTOR.
Angus S. Macdonald
BY
ATTORNEYS

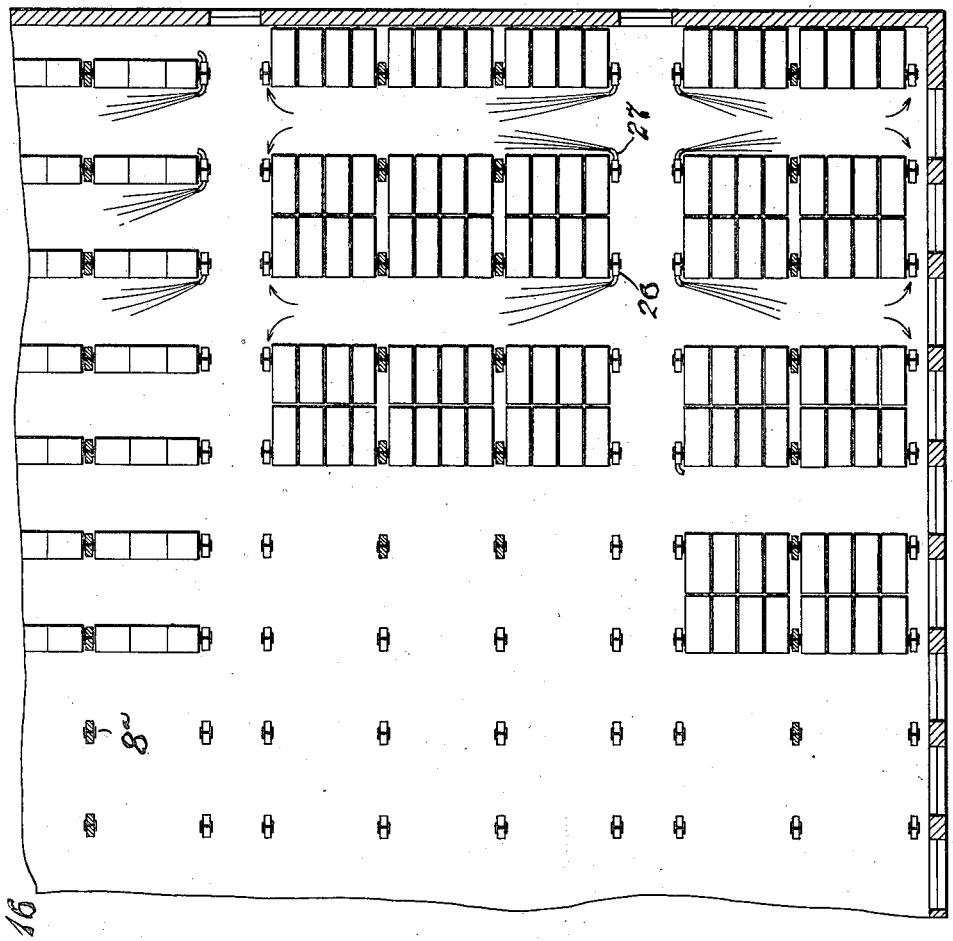
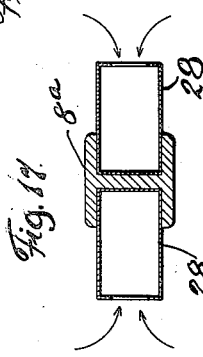
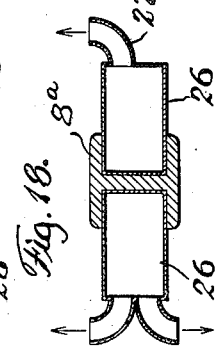
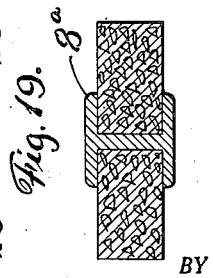

Patented June 18, 1935

2,005,434

UNITED STATES PATENT OFFICE 2,005,434

CONVERTIBLE BOOKSTACK

Angus S. Macdonald, New York, N. Y., assignor to Snead & Company, Jersey City, N. J., a corporation of New Jersey Application January 6, 1932, Serial No. 585,008

8 Claims. (Cl. 189—34)

This invention relates to convertible bookstacks, and its nature, objects and advantages will be best understood from the following, and is in part a continuation of application Serial No. 465,321, filed June 2, 1930.

In large libraries such as university libraries, there is considerable material which is seldom used. The customary arrangement of stacks is one which provides ready access to the shelves and is of necessity such that the maximum of floor space cannot be effectively utilized. Hence it is costly to store inactive books in the usual form of stacks. To meet this situation I have proposed to provide in addition to the customary stacks, rolling cases, which will store a larger number of books for the same floor area occupied. This necessitates a library carrying the customary stacks as well as rolling cases.

According to the present invention I propose to provide what may be termed a convertible stack structure in which standard parts form the bulk of the structure and can be readily associated with the permanent structure of the library in end to end relation, to constitute ranges of readily accessible stacks, and which can be readily converted by adapter means into individual easily movable units such as rolling cases.

By this invention the general objects served by the combination of normally fixed standard stacks and rolling cases are also served, but more economically and efficiently. In addition, the arrangement is one which provides maximum flexibility in meeting all of the requirements as expanding of the library occurs.

I accomplish the foregoing by means of a construction which is illustrated in the preferred form in the accompanying drawings, wherein—

Fig. 2 is a section taken on the line 2—2 of Fig. 1 and is partially broken out.

Figs. 3, 4 and 5 are fragmentary views illustrating details of the invention on an enlarged scale.

Fig. 6 is an end elevation of a rolling case composed in large part of the standard members constituting the bulk of the structure in Figs. 1 and 2.

Fig. 7 is a section taken on the line 7—7 of Fig. 6.

Fig. 8 is a side elevation of Fig. 6.

Fig. 9 is a fragmentary view, on an enlarged scale, illustrating a detail of the assembly of the standard parts when converting them into a rolling case.

Figs. 10, 11 and 12 illustrate details of the adapter means employed in making the conversion, Fig. 11 being a section on the line 11—11 and Fig. 12 being a section on the line 12—12 of Fig. 10.

Fig. 13 is a detailed sectional view illustrating how certain of the standard parts are utilized in making the conversion.

Fig. 14 is a diagrammatic view illustrating how floor space is served by conversion.

Fig. 15 is a diagrammatic view corresponding to Fig. 14 illustrating a modification of the invention.

Figure 16:
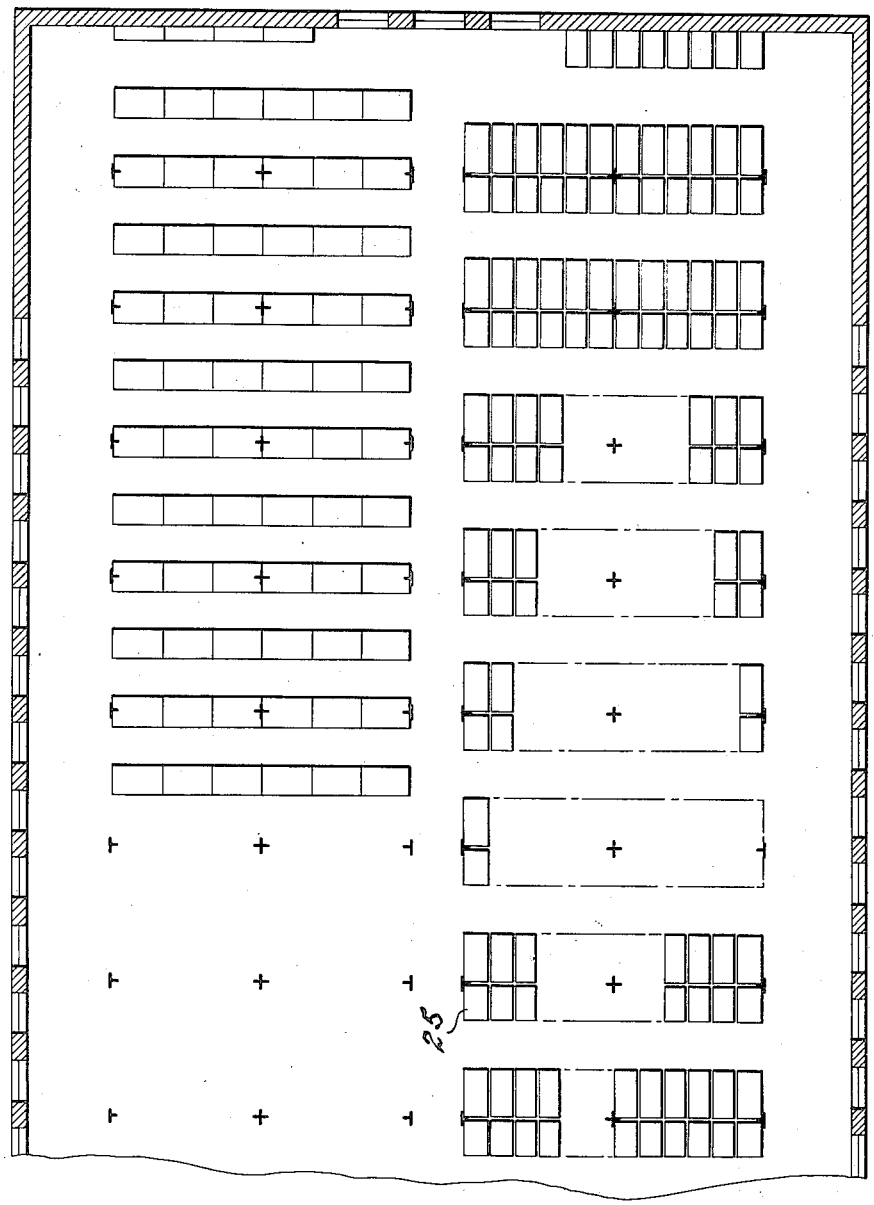

Fig. 16 is a similar view illustrating still another modification, and

Figs. 17, 18 and 19 are sectional views illustrating details of the arrangement of Fig. 16.

The invention will be first described when the standard parts are utilized in association with permanent portions of the library stack supporting structure to constitute the usual arrangement of normally fixed readily accessible shelving, reference being had to Figs. 14 and 1 to 5 inclusive.

Referring to these figures, it will be seen that flat slab flooring 7 is preferably employed, such flooring being supported on what may be termed the stack columns 8 desirably composed of two angles welded together as shown in Fig. 5. These columns support the flooring and in turn are supported thereby. The columns are arranged in rows and in spaced relation such that in association with the horizontal members 9 tying the columns together, adequate support for the spans is provided. These members 9 are only needed, if at all, longitudinally of te rows, the flooring otherwise being able to support the spans and supporting the columns in the other direction. In the drawings, the spacing is about 8' by 8'6".

Intermediate pairs of columns of a row are the bookstack sections A, in this case three such sections being shown in end to end relation, so that the sections constitute a range of readily accessible shelving.

The sections are composed of standard parts. Taking the middle section for purposes of illustration, it is composed of two spaced uprights 10, preferably channels, arranged with the webs out. The legs of the channels are provided with holes 11 to receive the hooks of the bracket shelves 12. The webs of the channels are provided with holes so that the end channels of adjacent sections may be bolted together by means of bolts 13 as illustrated in Fig. 4. At the ends of the sections adjacent the permanent stack columns 8, the uprights of the sections instead of being composed of one channel-shaped member, are composed of two angles 14 which are detachably bolted to the columns as indicated in Fig. 5. These angles also have holes 11' to receive the hooks of the bracket shelves. The uprights intermediate the columns may be provided with members or clips 15 for attachment to the members 9 for purposes of affording rigidity. The same bolts 13 which secure the channels together may be utilized to hold the clips 15. The bolt holes 13' which receive the bolts 13 are preferably elongated for purposes of adjustment. The upper ends of the clips are fastened to the members 9 by such means as a hook bolt 16, and for purposes of compensation the holes 16' which receive the hook bolts are elongated. Thus variations encountered in the field can be readily met.

The bracket shelves are preferably of uniform length and the distance between the fixed columns is desirably a multiple of the length of the sections in order to utilize effectively the maximum space between columns.

When the parts are thus assembled ranges of normally fixed readily accessible stacks are provided, which stacks are securely but detachably positioned.

Figure 1:
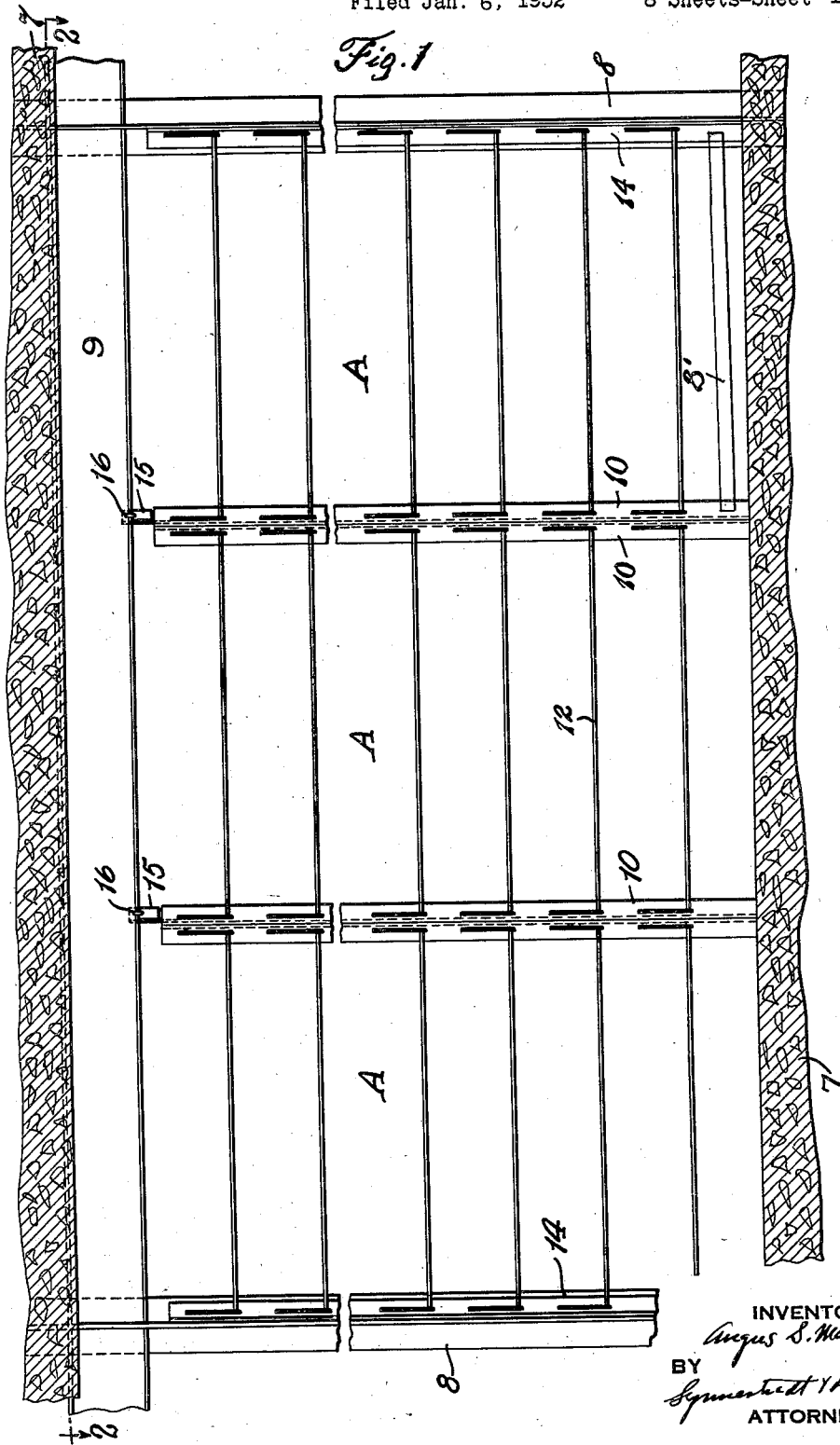
Fig. 1 is a vertical section through a deck or level of a library illustrating my improved convertible structure (in more or less diagrammatic form) in side elevation.

If, now, any portion of the stacks is to be converted into readily movable units for use in supporting inactive material, the procedure is as follows: The bolts which secure the uprights of the sections are removed, as are the hook bolts 16, and the clips are taken off. The uprights 10 are now attached to adapters to constitute a frame of a rolling case. The lower adapter is in the form of a wheeled truck 17 shown in Figs. 6, 7 and 8. The end members 18 of this truck are preferably in the form of a plate to which the channels 10 are bolted, the channels being provided with holes for this purpose, which holes may also be utilized to secure the channels back to back as shown in Figs. 1 and 2, for example. The upper adapter member consists of the spacing member 18' and the gusset plate 19 as shown in Fig. 8. The holes provided in the channels for the bolts 13 are utilized for bolting the channels to the gusset plates. Thus a rigid frame is provided which carries the shelving 12 as before, with this distinction—that each pair of uprights with its shelving in association with the adapters constitute an independent readily removable unit or rolling case. These rolling cases are placed in side by side relation instead of end to end relation, and as the distance between columns is preferably a multiple of a section, a much larger number of rolling cases can be accommodated in the space formerly occupied by the sections, as shown, for example, in Fig. 14.

In the case of the angles 14 which constitute the uprights of the sections at the ends adjacent the columns, these are used to form uprights of the rolling case after the manner shown in Fig. 13. This offsets the shelving slightly but that is of no consequence.

The truck 17 has rollers 20 and 21 on opposite sides arranged at different elevations so that the rollers of one case will not interfere with the rollers of another case. Abutments 21a are also provided to limit the movement of the rolling cases and a spring catch 21b is also provided for each case to releasably hold it in position. In order to make the rolling cases track properly, one axle 22 is mounted for adjustment through the medium of elongated holes 23 (see Fig. 10). Thus the standard parts constituting the sections when arranged as shown in Figs. 1 and 2, are now utilized in the rolling case, it being only necessary to add the adapter parts.

The distance between columns of a row is also a multiple of the width of the cases so that a relatively large number of the cases can be arranged, when converted to rolling cases, as shown in Fig. 14, for example, back to back, while still leaving aisles and sufficient room to withdraw the cases. The columns act as locaters and if desired may be provided with longitudinal strips 8' extending from column to column of a row, as indicated in Fig. 1, for the purpose of limiting the inward movement of the cases and align them particularly with those cases which are not immediately adjacent to the columns.

It will be clear that the rolling cases more effectively utilize the floor area and it is possible, by suitable arrangement of the columns, to increase the storage capacity of a given area as much as a hundred percent more than that afforded by the fixed stacks which, of course, very materially cuts down the cost of storage per volume.

The flat slab floor is substantially continuous, i. e., the flooring extends underneath the cases instead of stopping at the edges of the cases, as is usually the practice, in consequence of which no difficulty is encountered in making conversions nor with ventilation which may be of the character described in the aforesaid copending application.

In connection with the foregoing it will be appreciated that the absence of heavy beams, column caps and other means, such as ordinarily required in a building, is advantageous, not only in that it permits of flexibility of arrangement in conversion, but also in that floor area is effectively utilized. No trouble is also encountered in connection with the rolling cases.

In this connection it is to be observed that at most only horizontal connecting members are required longitudinally of the rows. These afford no interference, and if full height from floor to ceiling is to be utilized, the members 9 may be substantially buried in the floor as indicated in Fig. 3. Also a different form of horizontal member may be employed. The drawings indicate the members 9 as being of channel shape. They may be made of T-shape with the leg depending or of flat plate.

Similarly, to make the most effective use of the floor area, the cases as shown in Fig. 1, fit around the legs of the column, providing substantially continuous ranges of fixed cases. By making the width of cases correlate with the column spacing, the cases, when converted, fit to provide substantially continuous ranges. In case of different widths certain of the cases may be recessed as shown in Fig. 14 to nest about the columns.

Referring now to Figs. 8 and 14, reference will be made to the lighting. The lighting sockets will, of course, be located at suitable intervals— say every six feet—in the aisles between the fixed readily accessible cases. When conversion is made in some cases the sockets will not be properly located to give effective lighting for the rolling cases. To meet this condition the lights are removed from the sockets, which latter are preferably flush with the ceiling, and flexible cords 23 are attached, such cords leading from the sockets to such of the rolling cases as are provided with lights 24. The cords have slack so as to permit of the withdrawal of the cases. Not all of the rolling cases are supplied with lights, but only a number sufficient to give substantially the usual amount of lighting.

The description thus far has been directed to new installations. In Fig. 15 I have more or less diagrammatically illustrated the application of my improvements to an already constructed library where the spacing of the columns has been determined, for example, by the arrangement of windows employed. In this case the rows are too closely spaced together in one direction to permit of the arrangement shown in Fig. 14 and still leave sufficient aisle space. I, therefore, convert all of the fixed shelving to rolling cases and utilize them on one side of the rows employing shorter sections 25 on the opposite side of a row. This provides sufficient aisle space and coordinates the converted stack with the window lighting.

In the construction shown in Fig. 16 I have illustrated another modification of the invention where the spacing of the rows of columns is not such as to permit of the arrangement of Fig. 14. The arrangement of Fig. 16, while not as effective as that previously described, nevertheless utilizes floor area much more effectively than would ordinarily be the case. In this construction the H columns 8a are employed instead of cruciform columns and the distance between rows of columns in one direction is such that each row may be provided with the fixed readily available shelving as described, while still leaving adequate aisle space. When converting, however, this spacing is such that the rolling cases cannot be placed end to end along the axis of the rows without filling the aisle space. To make a conversion in this instance I arrange the rolling cases between columns and with their ends abutting at a line substantially mid-way of the longitudinal axis of a pair of rows of columns, as clearly illustrated in Fig. 16. The width of the cases in this instance is such as to so correlate with the distance between columns that the space between columns may be practically completely occupied and the length of the cases is such that when placed end to end as shown, aisle space will be provided between the ranges of the rolling cases.

The columns in this arrangement are preferably fire-proofed with concrete or the like, and at suitable points the concrete may be omitted and air ducts 26 substituted, these ducts extending vertically along the columns with nozzles 27 preferably located at the upper end thereof and turned so as to shoot jets of air longitudinally of the aisles. At other points exhaust ducts 28 may be similarly arranged with reference to the column. The arrangements thus described are shown on a large scale in Figs. 17, 18 and 19.

I claim:—

1. In a convertible metallic bookstack, the combination of pairs of uprights each pair having shelf supporting means, and each pair having detachable means whereby they may be associated with permanent library structure to provide ranges of normally fixed stacks and also means adapting them to be attached to a wheeled frame to enable conversion from a fixed stack into a rolling case, said wheeled frame having end members to which said uprights are attached through the medium of said last mentioned means, and said uprights when so attached constituting the uprights of the rolling case, and shelves carried by the uprights.

2. In a metal bookstack, pairs of uprights, and detachable adapter means having supporting members and means for attaching said uprights to said members to provide individual readily movable cases, said uprights having shelf supporting means, and also having means whereby, when the adapter means is detached, they may be detachably secured to permanent stack structure to enable conversion of the movable cases into ranges of normally fixed stacks, and shelving carried by the uprights.

3. In combination, in a sectional metallic bookstack each section having upright end supports and shelves supported therefrom, detachable means for securing sections to permanent stack structure in end to end relation of the sections, and adapter means having supporting members and means for attaching the upright end supports of a section to said members to convert a section from permanent stack structure into a readily movable unit upon removal of the detachable means.

4. In combination, in a sectional metallic bookstack each section having upright end supports and shelves supported therefrom, bolt holes in each upright whereby the sections may be bolted together in end to end relation for association with permanent stack supporting structure to provide normally fixed ranges, and adapter means having end members provided with bolt holes registering with certain of the bolt holes in the uprights of a section, and bolts for securing said uprights to said end members to convert each section from fixed structure into a readily movable unit.

5. In library structure, cases having end uprights, shelving, and means spaced along said uprights for securing the adjacent end uprights of adjacent cases together in end to end alignment to provide readily accessible ranges, and wheeled trucks having members for attachment of the end uprights of the cases to the trucks to enable conversion of the cases into rolling cases, said uprights being attached at their lower portions to said members through the medium of the lower of said spaced securing means.

6. In a convertible metallic bookstack, the combination of a stack comprising a pair of end uprights and shelves carried thereby, detachable means for securing said stack to permanent library structure to provide a normally fixed stack, and means for converting said fixed stack into a rolling case comprising a wheeled frame having end portions spaced to correspond to the spacing of the end uprights of the stack, and means engaging the lower portions of the end uprights and said end portions of the wheeled frame for attaching said stack to said wheeled frame, said means for securing the stack to permanent library structure being detached upon such conversion.

7. In a convertible metallic bookstack, the combination of a stack comprising a pair of end uprights and shelves carried thereby, detachable means for securing said stack to permanent library structure to provide a normally fixed stack resting on the library floor, and means for converting said fixed stack into a rolling case comprising a wheeled frame having end portions spaced to correspond to the spacing of the end uprights of the stack, and means for securing said end uprights to said end portions of the wheeled frame above yet in close proximity to the floor, said means for securing the stack to permanent library structure being detached upon such conversion.

8. In a convertible metallic bookstack, the combination of a stack comprising a pair of end uprights and shelves carried thereby, detachable means for securing said stack to permanent library structure to provide a normally fixed stack, and means for converting said fixed stack into a rolling case comprising a wheeled frame having end portions spaced to correspond to the spacing of the end uprights of the stack, and means engaging the lower portions of the end uprights and said end portions of the wheeled frame at vertically spaced points whereby to attach said stack to said wheeled frame with rigidity.

ANGUS S. MACDONALD.